UNITED STATES PATENT OFFICE.

CHRISTIAN H. GOEBEL, OF PHILADELPHIA, PENNSYLVANIA, ASSIGNOR TO THE CHESTER RAILWAY-FARE RECEIVER AND REGISTER COMPANY, OF NEW YORK CITY.

IMPROVEMENT IN FARE-BOXES.

Specification forming part of Letters Patent No. 172,421, dated January 18, 1876; application filed April 25, 1874.

*To all whom it may concern:*

Be it known that I, CHRISTIAN H. GOEBEL, of the city and county of Philadelphia, and the State of Pennsylvania, have invented a new and useful Improvement in Conductors' Fare-Boxes; and I do hereby declare the following to be a clear and exact description of the nature thereof, sufficient to enable others skilled in the art to which my invention appertains to fully understand, make, and use the same, reference being had to the accompanying drawings making part of this specification, in which—

Figures 1 and 2 are side elevations of the device embodying my invention. Fig. 3 is a central vertical section in line $x\ x$, Fig. 2. Fig. 4 is a vertical section of a portion in line $y\ y$, Fig. 3. Fig. 5 is a view of an interior portion. Fig. 6 is a partial view of Fig. 1, the cap of the gong and register being removed.

Similar letters of reference indicate corresponding parts in the several figures.

My invention relates to a portable fare-box, which is of tubular form, and may be grasped bodily by the hand. It consists in the receiver formed of an expansible casing. It also consists in providing the hopper with two leaves, which have a common axis centrally in the hopper, so as to open and close in opposite directions. It also consists in means for preventing the binding or clogging the fares at the base of the inspection-tube. It further consists in a trap at the base of the inspection-tube, for holding the fares and permitting the inspection thereof prior to their passage to the bottom of the receiver. It also consists in a rotary plate carrying the lock, and forming and closing the bottom of the receiving-tube. It further consists in means for simultaneously operating the trap at the base of the inspection-tube, the gong, and registering apparatus.

The proper manipulation of the hinged or swinging bar L is accomplished by a spring lever or pusher, M, which is jointed to said bar L, and projects horizontally through the side of the body C. A' represents an upright, which rises from the cross-bar J into the inspection-tube B direct, and occupies a position below the middle of the hopper G. To the spring-pusher M there is secured a curved arm, N, which extends along the inner circumference of the upper portion of the body of the casing, and its end N' is bent laterally and projects outwardly through a slot, $a$, in said body of the casing. (See Fig. 6.) P represents a spring-lever, which is mounted on E. L. HUTCHINSON.
COUPON CUTTING APPARATUS FOR RAILROAD USE.
No. 172,442. Patented Jan. 18, 1876.
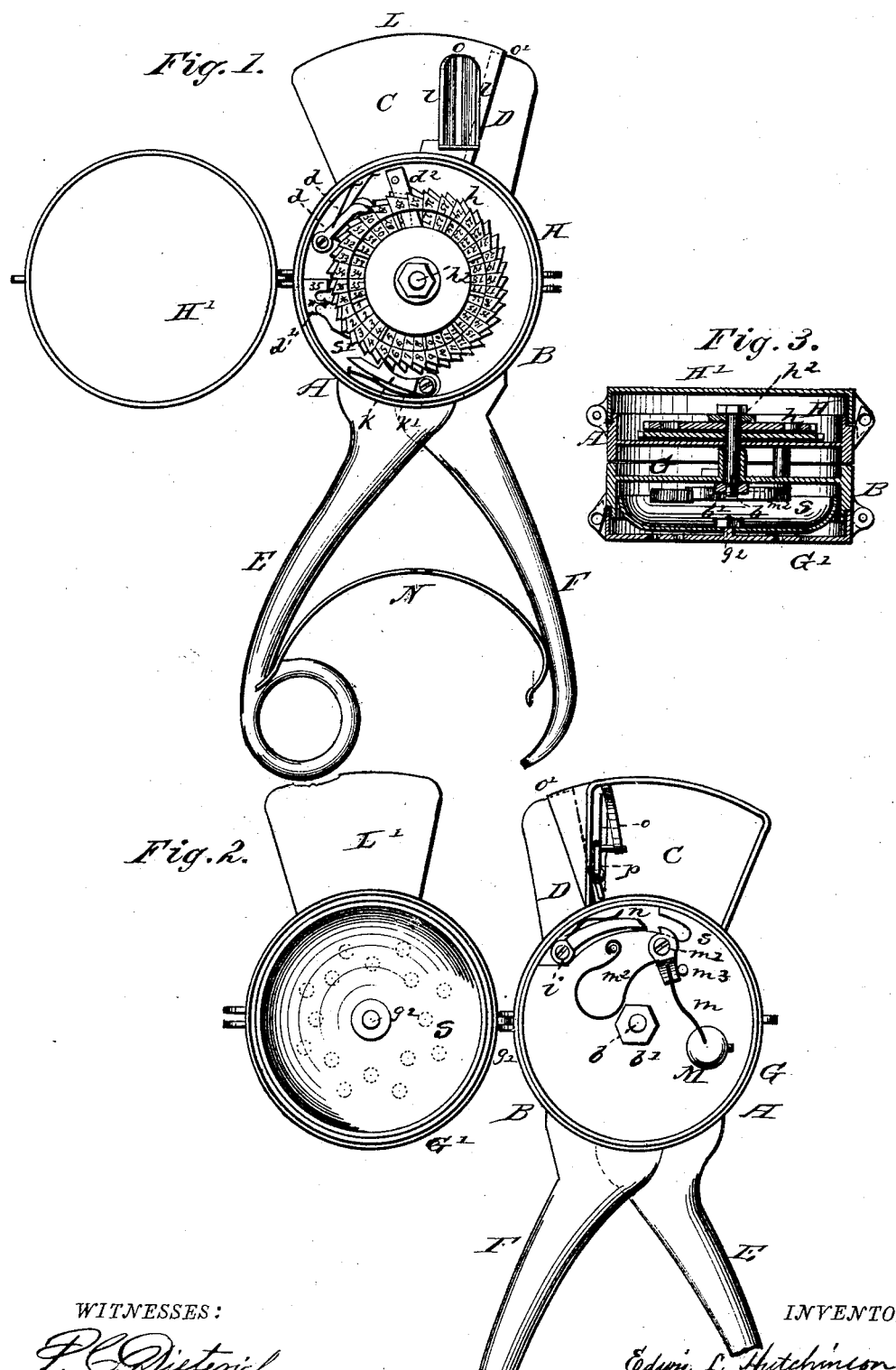

Referring to the drawings, A represents a casing, which is preferably of cylindrical form, and constructed of the transparent tube B, the main body C, and extensible portion D, the said tube B being at the top or receiving end of the casing, and the extensible portion D at the bottom or discharging end thereof, the body C and portion D being connected by a telescopic joint. A hopper or mouth, G, is placed at the top of the casing A, and opens into the transparent tube B thereof, and within the hopper, at the bottom thereof, there are arranged two leaves, H, which constitute the first trap, and are suspended from a transversely-arranged rod or bar secured to the hopper, and adapted to open downwardly to a certain extent, (see Fig. 4,) for permitting the passage of fares into the transparent tube B of the casing, wherein said fares may be viewed and inspected. At or about the junction of the transparent tube B and body C there is secured a horizontally-arranged cross-bar, J, to the sides of which there are hinged leaves K, which, when in a horizontal position, are adapted to close communication between the parts B C of the casing A, and constitute the middle trap of the casing. A bar, L, is hinged to the under side of the fixed cross-bar J, and is of such dimensions, and so adapted, that when it extends at right angles to the axis of the leaves K it occupies a position beneath said leaves, and supports them in horizontal position; but when said bar extends in line parallel with the cross-bar J, or the axis of the leaves K, the latter lose the support of said bar L, and thus fall, whereby communication is established between the inspection-tube B and main body C of the casing A.